United States Patent
Berry et al.

(12) 
(10) Patent No.: US 6,225,462 B1
(45) Date of Patent: May 1, 2001

(54) CONJUGATED POLYSACCHARIDE FABRIC DETERGENT AND CONDITIONING PRODUCTS

(75) Inventors: Mark John Berry; Paul James Davis; Michael John Gidley, all of Sharnbrook (GB)

(73) Assignee: Lever Brothers Company, a division of Conopco, Inc., New York, NY (US)

( * ) Notice: Subject to any disclaimer, the term of this patent is extended or adjusted under 35 U.S.C. 154(b) by 0 days.

(21) Appl. No.: 09/229,043

(22) Filed: Jan. 12, 1999

(30) Foreign Application Priority Data

Jan. 16, 1998 (EP) .................................................. 98300292

(51) Int. Cl.$^7$ .............................. C07H 1/00; C07H 3/00
(52) U.S. Cl. .................................. 536/123.1; 536/123.12; 536/55.1; 536/56; 536/112; 536/124; 435/12; 435/18; 435/27; 435/28; 252/8.6; 252/174.12; 252/174.17; 252/DIG. 12; 530/300; 530/345; 530/350
(58) Field of Search ..................................... 435/7.2, 7.21, 435/12, 18, 27, 28; 530/300, 345, 350; 536/45, 46, 56, 81, 112, 1.11, 123.1, 123.12, 124, 55.1; 252/8.6, 174.12, 174.17, DIG. 12

(56) References Cited

U.S. PATENT DOCUMENTS

| | | |
|---|---|---|
| 2,949,397 | 8/1960 | Werner et al. . |
| 3,297,604 | 1/1967 | Germino . |
| 3,516,941 | 6/1970 | Matson . |
| 4,075,405 | 2/1978 | Takahashi et al. . |
| 4,234,627 | 11/1980 | Schilling . |
| 4,681,806 | 7/1987 | Matkan et al. . |
| 5,051,305 | 9/1991 | Whitaker, Sr. . |
| 5,336,506 | * 8/1994 | Josephson et al. ................... 424/488 |
| 5,773,227 | * 6/1998 | Kuhn et al. .......................... 435/7.21 |
| 5,874,308 | * 2/1999 | Kilburn et al. ....................... 530/350 |
| 6,048,715 | * 4/2000 | Haynes et al. ........................ 435/179 |

FOREIGN PATENT DOCUMENTS

95/34628  12/1995 (WO) .

OTHER PUBLICATIONS

Derwent Abstract of JP 61155307—published Jul. 15, 1986.
Derwent Abstract of JP 61133299—published Jun. 20, 1986.

* cited by examiner

Primary Examiner—James O. Wilson
(74) Attorney, Agent, or Firm—Rimma Mitelman

(57) ABSTRACT

A polysaccharide conjugate comprises a polysaccharide with an attached entity having a molecular weight of at least 5000, the polysaccharide conjugate being capable of binding to cellulose. Preferred polysaccharides include tamarind seed xyloglucan, locust bean gum and enzyme modified guar. The attached entity is suitably a protein such as an enzyme, antibody or antibody fragment, or a particle possibly having a benefit agent such as a fragrance associated therewith. Because the polysaccharide conjugate binds to cellulose, which is present in cotton and other fabrics, paper, etc., binding of the conjugate to cellulose brings the attached entity into close proximity to a surface of or containing cellulose. The invention thus enables targeting of attached entities to such surfaces. The invention also provides a product incorporating the polysaccharide conjugate of the invention. The product is conveniently a laundry product such as a fabric washing product, e.g. a detergent product, or a fabric conditioning product. In this case the attached entity may be an enzyme, a particle bearing fragrance, etc. The invention also provides a method of targeting binding of an entity to cellulose by use of the polysaccharide conjugate of the invention.

10 Claims, No Drawings

CONJUGATED POLYSACCHARIDE FABRIC DETERGENT AND CONDITIONING PRODUCTS

FIELD OF INVENTION

This invention relates to binding of polysaccharides and concerns a cellulose-binding polysaccharide conjugate, products including the polysaccharide conjugate, and targeting methods using the polysaccharide conjugate. In the context of the invention the term "polysaccharide" is intended to cover polysaccharides and oligosaccharides, and references to "polysaccharide" and "polysaccharide conjugate" should be construed accordingly. The term "conjugate" is used to refer to units bound or secured together (physically and/or chemically), with a "polysaccharide conjugate" comprising a polysaccharide bound or secured to another entity.

BACKGROUND TO THE INVENTION

It is known that various naturally occurring polysaccharides such as pea xyloglucan, tamarind seed xyloglucan, etc. bind to cellulose by a polysaccharide:polysaccharide interaction; indeed this binding ability is important in the functioning of plant cell walls.

U.S. Pat. No. 3,297,604 concerns polymer compositions containing galactose oxidized to form a carbonyl group at the C6 position. The active carbonyl group can react in known manner, e.g. to form cyano hydrins, bisulfite addition compounds, oximes, hydrazones, etc. The compositions can also act to cross-link polymers, including cellulose. The polymer, may be, e.g., guar, locust bean gum, etc. There is no disclosure of a polysaccharide conjugate with attached entity of molecular weight of at least 5,000. While the polymer composition itself may be capable of binding to cellulose, this is not unexpected, and there is no disclosure of a polysaccharide conjugate that is capable of binding to cellulose.

U.S. Pat. No. 2,949,397 concerns use of mineral filler coated, at least partially, with water-dispersed organic colloid, to promote retention of filler in cellulose fibres in paper making. The colloid may be e.g. a galactomannans, or substituted mannan such as locust bean gum and guar gum. The coated filler is attracted to cellulose fibres by electrostatic action. The filler and colloid are mixed together, but separate on standing and hence are in the form of a simple mixture not a polysaccharide conjugate.

The paper by Hayashi et al entitled "Pea Xyloglucan and Cellulose" in Plant Physiol. (1987) 83, 384–389 describes investigations of binding of pea xyloglucan to cellulose, using fluorescein-labelled xyloglucan prepared by treating xyloglucan with CNBr and incubating with fluoresceinamine, and also using radioiodinated xyloglucan prepared by reaction of 125, with the fluorescein moiety on xyloglucan. These labels were used to trace the binding of the polysaccharide and are among the smallest molecular label entities known.

The present invention is based on the surprising discovery that polysaccharides with much larger attached entities than those used by Hayashi et al can still bind rapidly with high efficiency to cellulose by polysaccharide:polysaccharide interaction. This is surprising because binding occurs at multiple sites along the backbones of the polysaccharides, rather than at a single binding site as with antibody-antigen interactions, and it would have been predicted that binding would have been disrupted by the attachment of large entities to cellulose-binding polysaccharides. The invention thus opens up the possibility of using polysaccharides to target attached entities to cellulose, e.g. in fabric, paper, etc.

SUMMARY OF THE INVENTION

In one aspect the present invention provides a polysaccharide conjugate comprising a polysaccharide with an attached entity having a molecular weight of at least 5000, the polysaccharide conjugate being capable of binding to cellulose.

The polysaccharide conjugate is preferably capable of binding to cellulose by polysaccharide:polysaccharide interaction.

The polysaccharide may be one that binds naturally to cellulose or has been derivatised or otherwise modified to bind to cellulose. The polysaccharide may be naturally occurring or synthetic.

The polysaccharide desirably has a 1–4 linked β-glycan (generalized sugar) backbone structure, which is stereochemically compatible with cellulose, such as a glucan backbone (consisting of β 1–4 linked glucose residues), a mannan backbone (consisting of β 1–4 linked mannose residues) or a xylan backbone (consisting of β 1–4 linked xylose residues). Suitable polysaccharides include xyloglucans, glucomannans, mannans, galactomannans, β(1–3), (1–4) glucan and the xylan family incorporating glucurono-, arabino- and glucuronoarabinoxylan. See "Physiology and Biochemistry of Plant Cell Walls" (1990) by C. Brett and K. Waldron for a discussion of these materials.

The minimum chain length requirement for cellulose oligomers to bind to cellulose is 4 glucose units. For xyloglucans, the side chains make the binding less efficient and 12 backbone glucose units (i.e. about 25 total sugar units) are required for binding to cellulose. Structural considerations suggest galactomannans are intermediate in binding efficiency, and about 6 to 8 backbone residues are expected to be required for binding to cellulose. The polysaccharide should thus have at least 4, and preferably at least 10, backbone residues, which are preferably β1–4 linked.

Naturally occurring polysaccharides that bind rapidly and strongly to cellulose by polysaccharide:polysaccharide interaction include xyloglucans such as pea xyloglucan and tamarind seed xyloglucan (TXG) (which has a β 1–4 linked glucan backbone with side chains of a-D xylopyranose and—D-galactopyranosyl-(1-2)-α-D-xylo-pyranose, both 1–6 linked to the backbone:see Gidley et al Carbohydrate Research, 214 (1991) 200–314 for a discussion of the structure of tamarind seed polysaccharide); and galactomammans, particularly low galactose galactomannans, such as locust bean gum (LBG) (which has a mannan backbone of β 1–4 linked mannose residues, with single unit galactose side chains linked 1–6 to the backbone), enzyme modified guar (EMG) (guar gum has the same structural units as LBG but has a much higher level of galactose substitution, to the extent that there is not enough accessible mannan backbone through which to bind cellulose. EMG is produced by enzymic removal from guar gum of a controllable percentage of the galactose residues to produce a range of materials that are capable of binding to cellulose, but are cheaper and more consistently available than LBG. See Bulpin et al. in Carbohydrate Polymers 12 (1990) 155–168 for a discussion of EMG), tara glactomannan and cassia galactomannan. These materials are commercially available and thus provide potentially useful sources of suitable polysaccharides. These materials have the advantages of being relatively cheap, and already being accepted for food use.

The polysaccharide desirably has side chain galactose residues susceptible to oxidation by galactose oxidase, for production of an aldehyde group for coupling of a protein entity, as will be described below. TXG, LBG and EMG have such galactose residues.

The attached entity may be selected from a wide range of entities that generally perform a useful function in proximity to cellulose, e.g. in fabric, paper, etc.

For example, the entity may be a protein, such as an enzyme, antibody or antibody fragment.

The enzyme is conveniently an oxidase, peroxidase, catalase or urease. These enzymes work by their substrate diffusing to them, and generate a flux of active product of molecules that diffuse away. Redox enzymes, e.g. oxidases such as glucose oxidase, generate hydrogen peroxide which can act as a bleach. Peroxidase catalyses the oxidation by hydrogen peroxide of a number of substrates. Urease catalyses hydrolysis of urea, releasing a flux of ammonium ions which raises the local pH. Catalase is an oxidoreductase that catalyses conversion of hydrogen peroxide to water and oxygen.

Antibodies or antibody fragments may, for example, be used in separation or purification techniques, as is described below, or in immunoassays.

The attached entity may alternatively be a particle, e.g. of silica, organic polymer, etc. Such particles may have a benefit agent such as a dye, fragrance (or perfume), cosmetic, etc. associated therewith, e.g. by adsorption, impregnation or encapsulation.

Absorption of a benefit agent such as a perfume by particles can be brought about simply by bringing the agent and the particles into contact, and allowing them to stand. The benefit agent, e.g. perfume, molecules can enter the particles by diffusion.

An alternative to the use of solid particles is to form hollow capsules in which a shell encapsulates the benefit agent.

One approach to the preparation of microcapsules of a benefit agent such as perfume is to disperse droplets of the benefit agent in an aqueous phase which contains water soluble polymer, and then form a polymer shell around these agent droplets by coacervation of the polymer at the interface between the agent and the aqueous phase. Once formed, the capsule wall usually requires further treatment to strengthen it. The encapsulation of perfume by coacervation has been described by Meyer, A in Chimica, 46, 101 (1992) and in U.S. Pat. No. 5,051,305.

A second approach to the formation of microcapsules of benefit agent is to disperse agent droplets in an aqueous phase, and then bring about a polymerisation reaction at the interface between the droplets and the aqueous phase. The polymerisation reaction which has mostly been employed is the formation of an aminoplast resin. This has been used for perfume encapsulation, as disclosed in U.S. Pat. No. 4,681,806. A typical procedure for the production of aminoplast resin capsules enclosing perfume is set out in U.S. Pat. No. 4,234,627, which refers back to U.S. Pat. No. 3,516,941.

A further possibility is to form solid polymer particles, absorb the benefit agent such as perfume into these, and then encapsulate these particles.

Further information on encapsulation techniques is given in Risch, S. J., Reineccius, G. A. (Ed), "Encapsulation and controlled release of food ingredients", ACS symposium series 590, Washington D.C., 1995. It is to be noted that not all of the encapsulation techniques described in this reference are necessarily suitable for the preparation of particles for use in this invention. For instance, spray drying, which is the most widely used encapsulation technique, generally produces water-soluble particles which may not be particularly suitable. However, the person skilled in the art will readily be able to select suitable techniques.

The benefit agent typically constitutes between 1 and 90% of the total weight of the particle, and preferably constitutes at least 5% by weight to be commercially attractive. Using encapsulation techniques, benefit agent loadings of up to about 70% can be achieved, while absorption techniques, e.g. using highly absorbing silicas, can achieve loadings of up to about 90%.

The particle itself may constitute a benefit agent, e.g. silicone oil droplets.

The benefit agent conveniently comprises perfume (also referred to as fragrance). Perfumes are used to provide a pleasing fragrance to products in or on which they are used, and are known in the art to be mixtures of fragrance materials such as are discussed for example, in S. Arctander, Perfume and Flavor Chemcials (Montclair, N.J., 1969), in S. Arctander, Perfume and Flavor Materials of Natural Origin (Elizabeth, N.J., 1960) and in "Flavor and Fragrance Materials—1977", Allured Publishing Co. Wheaton, Ill. USA.

The particles suitably have a diameter in the range 0.5 to 100 microns. The lower end of this range (0.5 to 5 microns) covers small colloidal particles and molecular complexes.

The entity may be attached to the polysaccharide by a range of physical or chemical means. For example, proteins are conveniently chemically linked to polysaccharides having galactose side chains by enzymically oxidising the galactose, e.g. using galactose oxidase, to produce an aldehyde group to which an amino group of a protein can be chemically linked. As noted above, TXG, LBG and EMG have suitable galactose side chains. For polysaccharides not having suitable galactose side chains, different methods of chemical linking of proteins can be used. Alternative techniques include limited periodate oxidation, which requires the polysaccharide to have two adjacent hydroxyl groups in cis orientation, and results in the production of aldehyde groups which can be reductively aminated. A further possibility is reaction with cyanogen bromide (CNBr) which inserts into sugar rings at vicinal diols, both in the backbone and side chains, to provide an isourea linkage to the amino groups of proteins. It is preferred to use chemical techniques that do not affect the polysaccharide backbone length, which would reduce the cellulose-binding capability of the polysaccharide.

Polysaccharide is conveniently physically attached to particles, e.g. by adsorption. For example, porous silica particles have surface properties that enable firm adsorption of polysaccharide. Chemical attachment techniques may also be used. For example, for particles carrying surface amino groups, attachment can be by the techniques discussed above for attachment of proteins, e.g. via oxidation of galactose side chains. For particles with surface carboxyl or hydroxyl groups, other known forms of chemical linkage may be used. As a further possibility, where the particle is a liposome or micelle, hydrophobic tails fixed to the polysaccharide can be inserted therein.

Because the polysaccharide conjugate binds to cellulose, which is present in cotton and other fabrics, paper, etc., binding of the conjugate to cellulose brings the attached entity into close proximity to a surface of or containing cellulose. The invention thus enables targeting of attached entities to such surfaces. This targeting function is of use in a number of different potential applications including the following:

1. Targeting of enzymes to bind fabric, for example soluble oxidising enzymes such as glucose oxidase. Such enzymes will act to release hydrogen peroxide which can act as a bleach and thus has a fabric cleaning effect or acts to block dye transfer during washing to prevent colour running or greying of whites. Polysaccharide-oxidase conjugates thus find use in treatment of new cloth, particularly cotton-containing cloth, and as an ingredient in laundry products, such as fabric washing and conditioning products.

2. Targeting of particles containing a benefit agent to bind to fabric. The benefit may be, e.g., an enzyme as discussed, a fragrance, dye, cosmetic ingredient, etc. that can to advantage be attached to fabric via the polysaccharide. The benefit agent may be adsorbed, impregnated or encapsulated in the particle. Polysaccharide-particle conjugates of this sort thus find use as ingredients in laundry products.

In a preferred embodiment, the particles are porous and contain benefit agents in the pores: such benefit agents could be dyes, fragrances, sunscreens, etc. This embodiment involves filling the pores of the particles with the benefit agent and then blocking the pores with a coating of the polysaccharide so that the benefit agent does not come out of the particle again easily. It may, however, be possible to effect agent release if desirable, e.g. by ironing. Moreover, the coating has the combined effect of sealing the benefit agent in the pores and giving the particles a specific affinity for cellulose or cellulose-containing surfaces.

3. Targeting of enzymes, antibodies, particles, etc. to bind paper, for example to produce bleaching or dyeing of the paper.

4. Immobilising antibodies, enzymes or other molecules on a cellulose-containing surface, e.g. cellulose particles or paper, for instance for use in diagnostic tests or immunosorbent systems.

5. In separation or purification techniques, involving passage of polysaccharide conjugate through a cellulose bed to remove the conjugate. For example, by use of a suitable antibody-polysaccharide conjugate, antigen may become bound to the conjugate and then removed, e.g. from solution, by binding of the conjugate (and attached antigen) to cellulose, e.g. in a cellulose bed.

An additional benefit of the invention arises from the fact that, unlike most other targeting molecules, cellulose-binding polysaccharides are especially robust. Proteins such as cellulose binding domain can be inactivated (denatured) by heat or aggressive surfactants, while polysaccharides such as LBG, TXG, etc. are completely unaffected by such treatments. The polysaccharide conjugates of the invention thus offer the considerable advantage of extra stability and product compatibility compared with other targeting molecules.

In a further aspect, the present invention provides a product incorporating a polysaccharide conjugate in accordance with the invention. The product is conveniently a laundry product such as a fabric washing product, e.g. a detergent product, or a fabric conditioning product. In this case the attached entity may be an enzyme, a particle bearing fragrance, etc.

The invention also finds application in personal products, e.g. for targeting fragrance to bind to clothes. Other applications include, for example, diagnostic test systems, paper products etc.

The product may otherwise be of generally conventional formulation, as is well known to those skilled in the art. For a discussion of known detergent compositions see, for example, WO-A-95/34628, particularly pages 11 to 15.

The present invention also provides a method of targeting binding of an entity to cellulose by use of a polysaccharide conjugate in accordance with the invention.

The invention will be further described by way of illustration, in the following Examples.

EXAMPLE 1

Conjugation of Locust Bean Gum with Glucose Oxidase.

Materials and Methods

Purification of Locust Bean Gum

Locust bean gum (LBG) (supplied by Meyhall) was purified according to the following method. A 1% (w/v) LBG aqueous solution was prepared by dissolving 15 g of LBG in 1500 ml water at 80–90 C for 30 minutes with mechanical stirring in a Silverson Homogeniser. The resulting solution was centrifuged at 27,000 g (Sorval RC5C, 6×250 ml solutions, GSA rotor) for 30 minutes. The supernatant was removed and the remaining pellets were dissolved in 500 ml deionised water, again at 80–90 C for 30 minutes with the aid of the Silverson stirrer. This solution was further centrifuged as above. The resulting combined supernatants were then precipitated in iso-propanol (1:2, supernatant:isopropanol) at ambient temperature. The stringy precipitate was further washed in isopropanol, allowed to stand in acetone for an hour and then twice washed with fresh acetone. This purified LBG was dried in air and then in a vacuum oven at 45 C.

Oxidation of Locust Bean Gum by Means of Galactose Oxidase

Purified LBG was dissolved at 0.1% (w/v) in 0.1M sodium phosphate (pH 7.0) by heating to 80–90 C and periodically stirring with an Ultra-Turrax homogeniser. Galactose oxidase (Sigma, G7907) was dissolved in sodium phosphate, pH 7.0, to a concentration of 50 $\mu$g/ml. A 400 $\mu$l aliquot of this solution was added to 1.2 ml LBG solution (0.1% (w/v)) and the reaction mixture was incubated at 37 C for 5–16 hours, depending on the particular experiment.

Conjugation of Glucose Oxidase (GOX) to Oxidised LBG

Glucose oxidase (Sigma product no.7141, 12.5 mg) was weighed into a tube and 0.5 ml of oxidised LBG/galactose oxidase solution was added. The mixture was tapped gently to dissolve the glucose oxidase, then stood at ambient temperature for 2 hours. Sodium cyanoborohydride (NaBH$_3$CN, 10 $\mu$l at 19 mg/ml) was added and the tube was left at ambient temperature overnight. Glucose oxidase has an approximate molecular weight of 160,000.

Assay for Active Conjugate (Cellulose Binding)

General Procedure

All assays exploited the ability of galactomannans to bind to cellulose by polysaccharide:polysaccharide interaction. Sigmacell Type 20 cellulose particles, with an average size of 20 m (from Sigma) were used to provide a surface on which to capture cellulose binding molecules. A 50mg/ml slurry of Sigmacell was made in PBS+Tween (0.05%) (PBST). The assays were conducted in filter plates (Millipore, Product No. MAHVN4550) with 0.45 m pore size filters. The plates were always pre-treated by soaking overnight in PBST with bovine serum albumin (BSA, 2% w/v) to prevent non-specific binding of enzyme or conjugate. Solutions were drawn through the filter plate using a commercially available vacuum manifold (Anachem). The overnight treatment solution (PBST/BSA) was removed prior to the experiment. 100 $\mu$l of the Sigmacell slurry (shaken immediately prior to addition) was added to each well. 100 $\mu$l of appropriately diluted LBG-conjugates (see below) were added to the Sigmacell in the 96 well plates, and incubated for 10 minutes to allow binding to the cellulose surface. After 10 minutes the solution was drawn off under vacuum and the cellulose washed by addition of 150 μl of PBS+Tween (0.05%) five times. The assays then continued as shown below for each of the conjugates.

Assay of LBG/GOX Conjugate

The stock LBG/GOX conjugate, containing 25 mg/ml glucose oxidase and 0.1% (w/v) LBG, was diluted to a concentration of 25 μg/ml in PBST +BSA (2% wv). A control mixture containing 25 mg/ml glucose oxidase with unmodified LBG was also diluted to the same concentration to check for non-specific binding After incubation with the conjugates, the Sigmacell particles were washed and then TMB GOx substrate was added to each well. The TMB substrate was prepared by dissolving the following ingredients in 20 ml water:

disodium phosphate (0.45 mg),
citric acid (150 mg),
D-glucose (0.54 g),
horse radish peroxidase (100ng) and
200 μl of a 3,3',5,5'-tetramethylbenzidine (TMB) stock solution in DMSO (100 mg/10 ml DMSO).

The substrate was left with the particles for several minutes, until a blue colour developed. Before the optical densities were recorded, the substrate solution was acidified by the addition of 50 μl 2M HCl to each well, and the yellow product was drawn through onto a flat bottom 96 well plate. The OD at 450 nm was determined and recorded on an automatic plate reader.

Results

The reductive amination conjugation procedure yielded an active conjugate of the two molecules, GOx and LBG, as shown by the optical density values in Table 1. Both the cellulose binding activity of the galactomannan and the enzymic activity of the GOx had been retained and had been effectively combined in the conjugate. In contrast, the low OD value for the simple mixture of LBG and GOx provides confirmation that conjugate performance resulted from the chemical conjugation of the two molecules.

Table 1. Optical density values derived from the assay of test and control samples produced through the reductive amination conjugation procedure. Incubation with substrate was continued for only 5 minutes before the OD values were determined.

| TEST SAMPLE | OPTICAL DENSITY |
|---|---|
| Conjugate of LBG/GOx | 1.031 |
| Mixture of LBG/GOx | 0.001 |

EXAMPLE 2

Conjugation of Locust Bean Gum with Monoclonal Antibody 3299

Materials and Methods

LBG was purified and oxidised as described in Example 1.

Conjugation of Monoclonal Antibody 3299 to Oxidised LBG

A solution of a monoclonal antibody designated 3299 (MAb 3299, obtained from Unipath), specific for the pregnancy hormone human chorionic gonadotrophin (HCG), was dialysed overnight against 0.1M sodium phosphate buffer, pH 6.5. The final concentration of antibody was adjusted to 10 mg/ml by further dilution with the same buffer, as appropriate. MAb 3299 has an appropriate molecular weight of 150,000.

A sample (20 μl) of this MAb 3299 solution was mixed with 20 l of the oxidised LBG solution (as above) and the mixture stood at room temperature for 2 hours. A solution (1 μl) of NaBH$_3$CN (19 mg/ml) was added and the reaction left at ambient temperature, overnight.

Assay for LBG/Monoclonal Antibody 3299 Conjugate

LBG/MAb 3299 conjugate stock solution containing 5 mg/ml MAb 3299 and 0.05% LBG was diluted in PBST+ BSA (2% w/v) to an antibody concentration of 25 μg/ml. A control mixture containing 25 mg/ml MAb3299 with unmodified LBG was also diluted to the same concentration to check for non-specific binding. After incubation with the cellulose particles and subsequent washing, cellulose-bound monoclonal antibody was determined by means of alkaline phosphatase conjugated tracer molecules. These were either (a) rabbit anti-mouse IgG-alkaline phosphatase or (b) HCG-alkaline phosphatase. These tracer conjugates were diluted in PBST +BSA (2% w/v).

a) Rabbit anti-mouse IgG-alkaline phosphatase tracer conjugate (Sigma) was diluted 1/1000 and 150 μl of this was added to each LBG/MAb cellulose mix in the filter plates. After 1 hour the tracer conjugate was removed by filtration and the plates washed 10× with 200 μl per well PBST. Alkaline phosphatase substrate (Sigma 104) was added to each well (200 μl para-nitrophenyl phosphate, pNPP, lmg/ml in diethanolamine buffer, pH 10) and maintained at ambient temperature until a significant yellow colour had developed (about 30 minutes). The yellow product was then drawn through onto a microtitre plate in the usual way, and the OD at 405 nm determined.

b) HCG-Alkaline phosphatase tracer conjugate was diluted 1/200 and 150 μl of this was added to each LBG/MAb cellulose mix in the filter plates. The experiment then proceeded as in (a) above.

Results

The reductive amination procedure was found to be effective for conjugating antibodies to LBG, as shown by the values in Table 2. As for GOx, the values show that a chemical cross-linking process was necessary (rather than simple mixing) to make an active conjugate, and the procedure did not result in loss of binding activity in either molecule. The different tracer molecules (anti-mouse IgG and HCG) confirmed that the antibody had bound to the cellulose in a form that retained its specific, immunological binding ability (HCG), as well as its general immunoglobulin qualities (anti-mouse IgG).

The low but measurable binding values found with the mixed sample is evidence of a general "stickiness" associated with the monoclonal antibody and cellulose particles (non-specific adsorption). However, the difference between the two sets is clear evidence of acceptable conjugation efficiency.

Table 2. Optical density values derived from the assay of test and control samples produced through the reductive amination conjugation procedure.

| | OD 405 nm | |
|---|---|---|
| TEST SAMPLE | a) - mouse IgG-AP | b) HCG-AP |
| Conjugate of LBG/MAb 3299 | 1.040 | 0.831 |
| Mixture of LBG + MAb3299 | 0.063 | 0.071 |

EXAMPLE 3
Conjugation of Locust Bean Gum with scFv3299
Materials and Methods

LBG was purified and oxidised as described in Example 1.

The single chain Fv antibody fragment of 3299 (scFv3299) is a genetically engineered fragment consisting of the variable regions of the 3299 parent antibody, produced in micro-organisms transformed with the relevant genes, suitably formatted for that host. To work with this material it was first necessary to culture the transformed host organism, induce expression of the gene and then purify the scFv from the supernatant fluid of the culture. The engineered scFv3299 also carried a short oligo-histidine "tail" which could bind to immobilised nickel ions as a means of purification (the IMMAC procedure). scFv 3299 has an approximate molecular weight of 26,000.

Production and Purification of ScFv

The antibody fragment scFv3299, modified by the addition of a short oligo-histidine tail, was produced in a transformed host micro-organism (e.g. $E.\ coli$) using conventional methods well known to those skilled in the art. The scFv3299 protein was purified by standard methods through an IMMAC procedure and then through Mono S (cation exchange) chromatography. The purified protein solution was subjected to a buffer-exchange process through a PD-10 gel filtration column (Pharmacia) into 0.1M phosphate buffer pH 6.5.

Thiolation of ScFv3299 with 5-Acetylmercaptosuccinic Anhydride (SAMSA)

Purified ScFv 3299 at 1.4 mg/ml in phosphate buffer pH 6.5 0.1M (150 µl) was placed in a 0.6 ml "Reactivial" (Pierce). A solution (20 µl) of SAMSA (supplied by Sigma) dissolved in dimethylformamide at the rate of 6 mg/ml was then added to the vial. This reaction mixture was stirred for 30 min at ambient temperature. The following were then added in succession, the resultant mixture being stirred for 5 minutes after each addition:

25 µl 0.1M EDTA, pH 8.0
100 µl 0.1M Tris HCl pH 7.0
100 µl 1M Hydroxylamine

After the final addition, the mixture was diluted to 2.5 ml in 0.1M sodium phosphate+5 mM EDTA, pH 6.5 and applied to a PD-10 gel filtration column. The protein-thiol conjugate was eluted in 3 ml phosphate +EDTA buffer, which was concentrated again by reducing the volume to 150 µl through a Centricon 10 device (Amicon).

Derivatisation of LBG with MPBH 4 (4-N-maleimidophenyl) butyric acid hydrazide.HCl (MPBH, Pierce Product No 22305) was dissolved at 10 mg/ml in dimethylsulphoxide (DMSO). Oxidised LBG was prepared as described above, except that at the end of the process the galactose oxidase left with the product was denatured by heating to 98° C. for 15 mins. The resultant solution was subjected to buffer exchange with 0.1M sodium acetate, pH 5.5, by means of a Centricon 30 device (Amicon) and then the volume was adjusted back to the starting volume by the addition of more buffer solution, as appropriate. At this point in the procedure, MPBH in DMSO (21.3 µl) was added to 600 µl of the oxidised LBG solution, to give a final MPBH concentration of 1mM This reaction mixture was kept at ambient temperature for 2 hours with gentle agitation. The derivatised LBG product was then subjected to buffer exchange with 0.1M phosphate buffer, pH 6.5, by means of a Centricon 30 device, after which the volume was readjusted to 600 µl.

Conjugation of SAMSA-Derivatised ScFv with MPBH-Derivatised LBG

The ScFv-SAMSA solution (75 µl containing 0.105 mg) was mixed with LBG-MPBH (25 µl) and the volume made up to 125 µl with phosphate buffer. The reaction mixture was left at ambient temperature overnight.

Assay for LBG/scFv3299 Conjugate

LBG/scFv3299 conjugate stock solution containing 0.34 mg/ml scFv3299 and 0.02% LBG was diluted in PBST+ BSA (2% w/v) to an scFv concentration of 34 µg. As with the whole antibody conjugate, a mix of ScFv and LBG; containing the same relative amounts, were diluted to the same concentration. The assay procedure was as described above for the whole antibody conjugate, but only with the HCG-alkaline phosphatase tracer conjugate (since an scFv fragment could not be detected with anti-mouse IgG).

Results

The scFv3299 antibody fragment was found to have conjugated with LBG, as shown from the values in Table 3, even though a different, more complex conjugation method had been used. The difference between the control mixture values and the conjugate values is less than with the other systems, indicating either a lower efficiency of conjugation or a greater tendency for the unconjugated material to adsorb non-specifically. A lower conjugation efficiency is more likely, since a longer incubation time with substrate was needed to produce adequate OD values.

However, the results clearly show that even with the scFv fragment, a significant and useful degree of chemical conjugation had been achieved.

Table 3. Optical density values derived from the assay of test and control samples produced through the SAMSA/MPBH conjugation procedure.

| TEST SAMPLE | OPTICAL DENSITY (405 nm) |
| --- | --- |
| Conjugate of LBG/scFv3299 | 0.714 |
| Mixture of LBG + scFv3299 | 0.147 |

EXAMPLE 4
Conjugation of Active Proteins to Tamarind Seed Xyloglucan (TXG)

Tamarind seed polysaccharide (Glyoid 3S from Dainippon Pharmaceutical Co., Osaka, Japan) was dissolved in deionised water (16 h at 25 C or 10 min at 80 C followed by 2–3 h at 25 C) to give a 0.5–1.0% w/v suspension which was clarified by centrifugation (20,000 g, 30 min.), dialysed extensively against deionised water, and lyophilised.

The resulting TXG was then formed into conjugates with glucose oxidase, MAb 3299 and scFv 3299 exactly as described in Examples 1, 2 and 3 and the resulting conjugates were found to bind to cellulose.

EXAMPLE 5
Binding of Locust Bean Gum and Tamarind Seed Xyloglucan (TXG) to Benefit Agents Carried in Particles for Targeting to Fabric In this example, a blue dye was used as an example of a small organic molecule (i.e. a "model" benefit agent), silica was used as an example of a porous particle, and cotton was used as an example of a cellulose-containing fabric surface.

Materials and Methods
Preparation of Particles

Porous silica particles (mean pore-size 2 nm, average particle size 9 m) were obtained from Joseph Crosfield &

Sons (Warrington U.K.) Approx. 25 mg of silica was placed in each of three round-bottomed plastic tubes. 0.5 ml of 0.4% Coomassie blue (in purified water) was added to each and then they were mixed thoroughly and left for 1 hour at ambient temperature.

The tubes were centrifuged for 5 minutes [13,000 r.p.m. in a microcentrifuge (MSE)] and the supernatants removed. Each of the three tubes then received a different treatment in which 0.5 ml of one of the following was added.

a) purified water.

b) 0.1% TXG (ex. Tamarind seed) in phosphate buffer, pH 7, prepared as described in Example 4.

c) 0.1% galactomannan (ex. Iocust bean, LBG) in phosphate buffer, pH 7, prepared as described in Example 1.

The three tubes were mixed thoroughly and then rotated overnight at ambient temperature. After the overnight treatment, the tubes were centrifuged as before and the supernatants removed. The particles were washed once in water and then twice in saline (pH 7).

The particles were then resuspended in 1 ml saline (pH 7) and left at 4 C until required. There were, therefore, three different silica slurries, each containing approx. 25 mg silica in 1 ml of saline. The slurries were designated a), b), and c), depending on the treatment received, as set out above.

Targeting the Particles to Fabric

Three squares (approximately 1 cm×1 cm) were cut from white cotton cloth. These were equilibrated in saline, pH7, by shaking each one with 2 ml of saline in a plastic tube. There were then three tubes each containing 2 ml of saline and one cotton square.

To each tube 100 µl of silica slurry was added. A different sample of slurry was added to each tube: either a), b), or c). The three tubes were rotated slowly at room temperature for 2 hours, after which the three cotton squares were removed and photographed. The appearance of blue coloration was carefully observed and noted.

Results

Treatment with the polysaccharides had endowed the particles with an ability to bind to the fabric. Moreover the Coomassie blue had been retained in the pores of the silica, the retention being aided by the polysaccharide coating. After the gentle but significant exposure and washing process (rotation for 2 hours), colour was found to adhere to the fabric surface, as shown in Table 4.

Table 4. Blue coloration remaining on fabric squares treated with Coomassie blue loaded silica particles coated with LBG or TXG.

| PARTICLES APPLIED TO COTTON | RESULTING COLOUR OF SQUARE |
| --- | --- |
| slurry a) | white |
| slurry b) | medium blue |
| slurry c) | dark blue |

It is concluded that the LBG and TXG are able to adsorb in some way to the particle surface and yet still retain the ability to bind to cellulose, providing the means for particle targeting to cellulose surfaces.

EXAMPLE 6

Binding of Locust Bean Gum (LBG) to Fragrance-Enriched Particles for Targeting to Fabric.

Materials and Methods

Preparation of Particles

Porous silica particles (mean pore-size 2 nm, average particle size 9 m) were obtained from Joseph Crosfield & Sons (Warrington U.K.). Approximately 25 mg of silica was placed in each of two round-bottom plastics tubes. 0.5 ml of the fragrance florocyclene (obtained from Quest International, Ashford U.K.) was added to each of the tubes and mixed thoroughly. The lids of the tubes were sealed to prevent evaporation of the fragrance.

The two tubes were rotated overnight with a gentle tumbling motion to allow the fragrance molecules to enter the pores of the particles. This was done at ambient temperature.

The tubes were centrifuged for 5 minutes [13,000 r.p.m. in a microcentrifuge (MSE)] and the supernatants discarded. Each of the two tubes then received a different treatment in which 1 ml of one of the following was added.

a) 1 ml of 0.1% LBG (Sigma Product No. G-0753)

b) 1 ml of purified water.

The two tubes were mixed thoroughly and then rotated overnight at ambient temperature. After the overnight treatment, the tubes were centrifuged as before and the supernatants removed. The particles were washed once in water and then twice in saline (pH 7). The particles were then resuspended in 1 ml saline (pH 7) and left at ambient temperature until required. There were therefore two different slurries, each containing approximately 25 mg of silica in 1 ml of saline. The slurries were designated a) or b) depending on the treatment received as set out above.

Targeting the Particles to fabric

Two squares (approximately 1 cm×1 cm) were cut from white cotton cloth.

2 ml of saline was added to each of two plastics tubes. 100 µl of slurry a) was added to one; 100 µl of slurry b) was added to the other. One cotton square was added to each of the two tubes a) and b).

The two tubes were rotated slowly at room temperature for two hours; after which the cotton squares were removed with tweezers. Each square was placed in a separate Petri dish. The lids of the Petri dishes were used to prevent evaporation of the fragrance.

Results

Eight people were asked to compare cotton squares treated with slurry a) and slurry b) and decide which of the cotton squares smells the strongest.

6 out of 8 said that a) was the strongest 1 out of 8 said that b) was the strongest 1 out of 8 could not tell the difference.

It was concluded that the cotton square treated with slurry a) had more fragrance on it due to the targeting effect of the LBG.

What is claimed is:

1. A laundry detergent or a fabric conditioning product comprising a polysaccharide conjugate comprising a polysaccharide with an attached protein, said protein being selected from the group consisting of an enzyme, antibody, and an antibody fragment said protein having a molecular weight of at least 5,000 Daltons , said polysaccharide having a 1–4 linked glycan backbone structure and said polysaccharide conjugate being capable of binding to cellulose in fabric.

2. A product according to claim 1, wherein the polysaccharide has a glucan backbone, a mannan backbone or a xylan backbone.

3. A product according to claim 1, wherein the polysaccharide is selected from the group consisting of xyloglucans, glucomannans, mannans and galactomannans.

4. A product according to claim 1, wherein the polysaccharide is selected from the group consisting of tamarind seed xyloglucan (TXG), pea xyloglucan, low galactose galactomannans, enzyme modified guar (emg), tara galactomannan and cassia galactomannan.

5. A product according to claim 1, wherein the polysaccharide has side chain galactose residues susceptible to oxidation by galactose oxidase.

6. A product according to claim 1 wherein the enzyme is an oxidase, peroxidase, catalase or urease.

7. A product according to claim 1, whrein the protein is chemically attached to the polysaccharide.

8. A product according to claim 1, wherein the protein has available amino groups and is chemically linked to aldehyde groups formed on the polysaccharide.

9. A product according to claim 1, wherein a protein entity is chemically linked to a polysaccharide selected from the group consisting of tamarind seed xyloglucan, locust bean gum, enzyme modified guar, via aldehyde groups produced by enzymic oxidation of galactose side chains.

10. A method of binding of a protein to cellulose by use of a polysaccharide conjugate comprising: 1) providing a product in accordance with claim 1; 2) providing cellulose; and 3) binding said protein to said cellulose.

\* \* \* \* \*